United States Patent [19]

Kespohl

[11] Patent Number: 5,394,095
[45] Date of Patent: Feb. 28, 1995

[54] SENSOR FOR STRIP OF CONDUCTIVE MATERIAL

[75] Inventor: Peter Kespohl, Konigstein, Germany

[73] Assignee: FIFE GmbH, Frankfurt, Germany

[21] Appl. No.: 96,648

[22] Filed: Jul. 22, 1993

Related U.S. Application Data

[63] Continuation of Ser. No. 676,163, Mar. 26, 1991, abandoned.

[30] Foreign Application Priority Data

Mar. 27, 1990 [DE] Germany ............................ 4009697

[51] Int. Cl.$^6$ ............................................ G01R 27/26
[52] U.S. Cl. .................................................... 324/674
[58] Field of Search ................ 324/674, 661–665, 324/671, 682, 686, 688, 690, 663, 660, 662

[56] References Cited

U.S. PATENT DOCUMENTS

| | | | |
|---|---|---|---|
| 3,312,892 | 4/1967 | Parnes | 324/660 |
| 3,341,774 | 9/1967 | Dyben | 324/663 |
| 3,812,424 | 5/1974 | Abbe | 324/688 |
| 4,322,678 | 3/1982 | Capots et al. | 324/663 |
| 4,719,409 | 1/1988 | Dorman | 324/688 X |
| 4,837,500 | 6/1989 | Abbringh | 324/660 |
| 4,922,181 | 5/1990 | Pullan | 324/690 |
| 5,134,379 | 7/1992 | Maher et al. | 324/690 |

FOREIGN PATENT DOCUMENTS 1574292  8/1978  Germany ............................ 324/682

Primary Examiner—Walter E. Snow
Assistant Examiner—Maura K. Regan
Attorney, Agent, or Firm—Ladas & Parry

[57] ABSTRACT

A sensor device for a noncontact sensor for the control of moving strips of conductive material. One or more detector electrodes are capacitively coupled to a counterelement. An oscillator governs this coupling and forms two coupling fields at the two edges of the strip. Lateral movement of the strip interacts with the two coupling fields. The at least one detector electrode is embraced by at least one shielding electrode, the shielding electrode being coupled through an amplifier of unity gain factor in such a manner to the at least one detector electrode that the potential of the at least one shielding electrode follows the potential of the detector electrode.

4 Claims, 4 Drawing Sheets

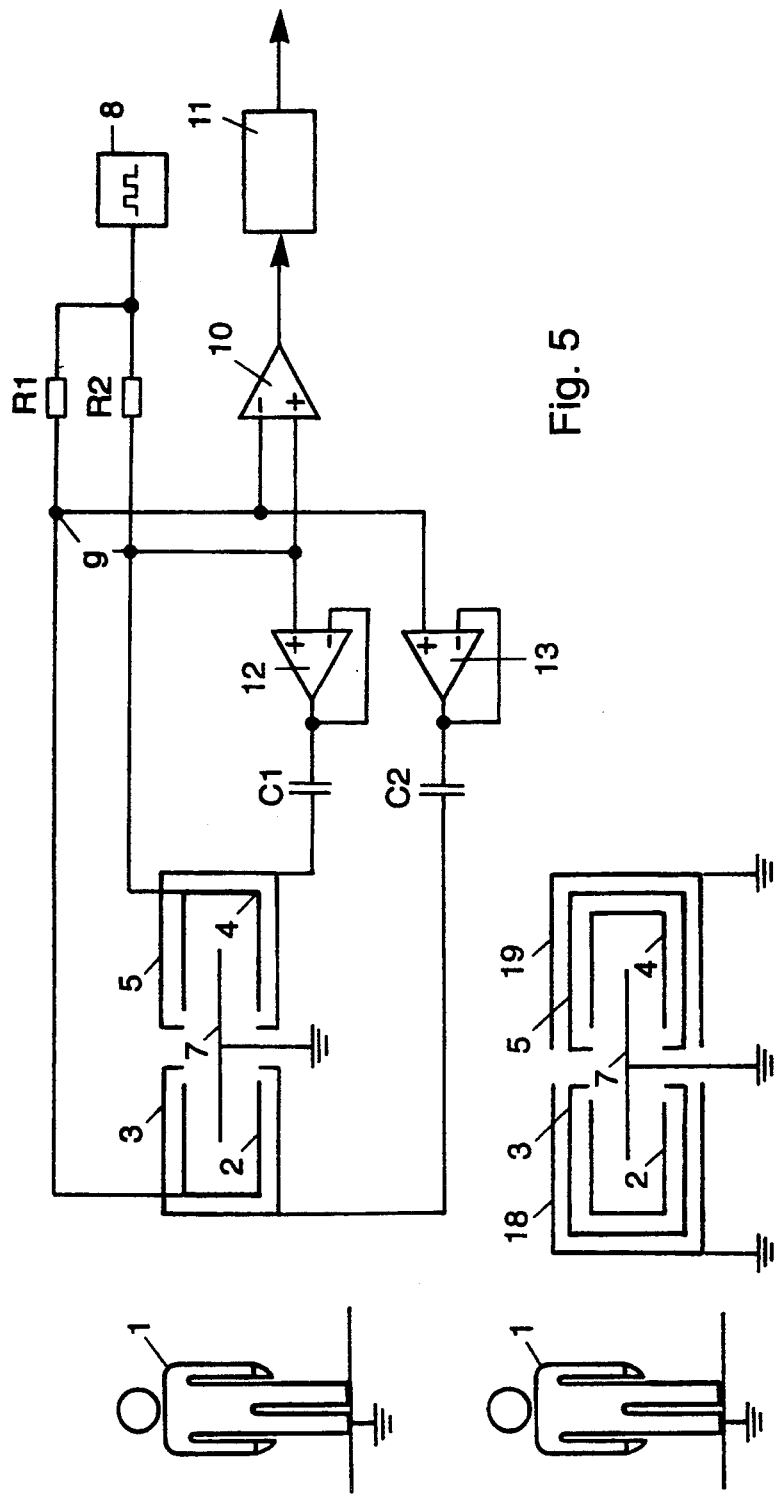

SENSOR FOR STRIP OF CONDUCTIVE MATERIAL

This is a continuation of application Ser. No. 07/676,163, filed Mar. 26, 1991, now abandoned.

TECHNICAL FIELD

This invention relates to a noncontact sensor for webs or strips of conductive material, the sensor having one or more detector electrodes which are capacitively coupled to another element and an oscillator which governs this coupling. Two coupling fields are formed in the area between two edges of the strip. Any lateral movement of the strip will interact with the two couplings.

BACKGROUND OF THE INVENTION

Such a device can be found in the prior art. For example, as mentioned in German laid open document DE-AS 15 74 292, two detector electrodes are provided in the area of the edges of the strip which are capacitively coupled onto the strip and create such a capacitance field. A lateral movement of the strip causes changes in that field which are then used to control the lateral positioning of the strip. C-shaped detectors have been used in industry and are known to provide a compact structure.

This device of the German laid open document is not very sensitive to changes of the strip position. Its insensitivity is caused by the fact that the detector electrodes not only create capacitances with the strip edges (useful capacitance), but also with every nearby machine part (extraneous capacitance). Such extraneous capacitance is connected in parallel to the useful capacitance and thus reduces the relative sensitivity of the sensor to strip position changes. Since the interfering machine parts near the detector electrodes are, in general, not symmetrically arranged, other capacitors have to be connected in parallel as compensation. This, however, further reduces the sensitivity of the system.

The low sensitivity to strip position changes is also mentioned in German laid open document DE-AS 15 74 292. To remedy this, the capacitance of the coupling fields is supplemented to an oscillator circuit by means of an inductive reactance. With this, the strip position changes influence the resonance frequency of the oscillator circuit. The quality (Q) of the oscillator circuit can influence the sensitivity of the total arrangement to strip position deviations. High quality gives high position sensitivity.

In this way, the sensitivity of the device can be increased; however, the disadvantage of this, as well as other known techniques for capacitive strip position detection, is that the detector electrodes not only react to the deviations of the controlled strip, but also to all other nearby conductive parts. The influence of machine parts can be compensated insofar as the strip can be center guided. However, compensating capacitors connected in parallel to the detector capacitances prove to be disadvantageous to the position sensitivity of the system since the capacitance change caused by a strip movement represents only a small fraction of the total capacitance of the total capacitance of the system.

If the machine has moving conductive parts, compensation by means of a fixed-shunt capacitor is not possible. Also, the human body represents a sufficient conductive counterelectrode so that each person moving around or near such sensor devices causes interference with the system. This situation is very disturbing to the maintenance and operation of such systems since interference with strip control can easily result in damages to the material in-process and to the system. For these reasons, the techniques described in the aforementioned German laid open document are not widely used in the industry. Instead, optical scanning devices for the strip edges are preferred, even though their susceptibility to interference from dust and dirt is high.

It is possible to shield the sensor against moving conductive parts and/or people. But, shielding of the detector electrodes against the described interference creates even more parallel capacitances and results, again, in sensitivity reduction. For that reason, the distance between the detector electrode and its shield should not be less than the distance between the detector electrodes and the strip in order to maintain enough system sensitivity. That causes the size of the shield to grow and in many instances, a lack of space makes the installation of such a shield impossible.

An object of this invention is the creation of a capacitance sensor which detects the position of a moving strip and is at the same time substantially insensitive to external interferences and very sensitive to strip position deviations. It is also an object of the invention to be of compact construction.

Starting with a brief description of the technique, the method and apparatus of this invention is as follows: The detector electrode(s) in the area are turned away from the extraneous coupling fields and are surrounded by at least one shielding electrode. This shielding electrode(s) is connected by way of an amplifier(s) with a gain of unity to the detector electrode(s) in such a manner that the potential of the shielding electrode(s) is always the same as the potential of the detector electrode(s).

The described technique assures good shielding of the sensor with shielding electrodes close to the sensor. This not only saves space, but eliminates nearby interfering influences while the sensitivity is maintained. The sensitivity, e.g., the change in useful capacitance in reference to the strip position, can in this way be increased. Forming an oscillator circuit as suggested in German laid open document DE-AS 15 74 292 is no longer necessary and the large coils are no longer needed, which is in the interest of compact construction.

With the C-shaped sensor electrodes, it is possible that a deviation of the strip from the required position may not be detected. This can occur when one edge of the guided strip moves slightly away from its sensor electrode, but at the same time, comes closer to one leg of its electrode while the other strip edge moves toward its electrode without coming closer to one of its legs. In a case such as this, it is possible that the coupled capacitances between each of the strip edges and their proper sensor electrodes stay the same, in spite of a shifted strip position and, for that reason, the deviation is not detected.

Disclosed are embodiments of the invention which do not require the use of C-shaped sensor electrodes, but which rather use flat or planar electrodes, which embodiments eliminate the previously described difficulty. In this form, the strip edges themselves do not represent capacitance-connecting counterelements to the detector electrodes, but only influence the capacitance coupling between the detector electrodes and the counterelements, which, on their part, stay relatively fixed with respect to each other.

DESCRIPTION OF THE DRAWING FIGURES

The invention is further explained by way of certain embodiments described in the following detailed description, which makes reference to the accompanying drawing, wherein:

FIG. 5 is a circuit schematic of circuitry for use with the detector electrodes;

FIG. 6 is a schematic representation showing the electrodes equipped with an additional shield electrode;

DETAILED DESCRIPTION

Figure 1:
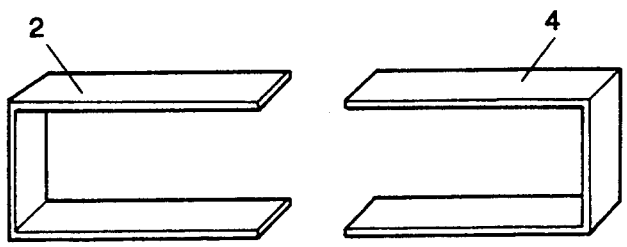
FIG. 1 is a perspective view of a pair of C-shaped detector electrodes which are typically installed in the shield electrodes of FIG. 2.
Figure 2:
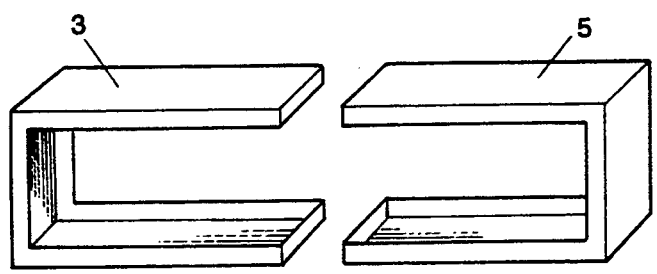
FIG. 2 is a perspective view of a pair of shield electrodes.
Figure 3:
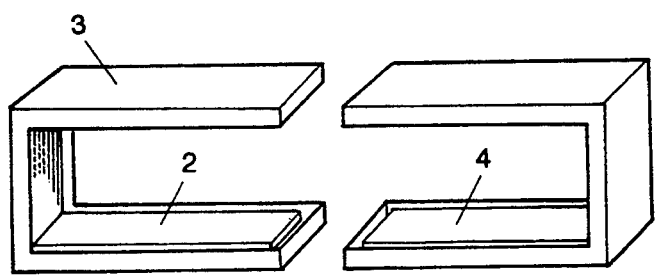
FIG. 3 is a perspective view of the structural unit of the detector and shield electrodes of FIGS. 1 and 2.

Electrodes 2, 4 depicted in FIG. 1 are electrically insulated from and disposed in the shielding electrodes of FIG. 2 so as to form a pair of C-shaped shielded electrodes as is depicted by FIG. 3.

Figure 4:
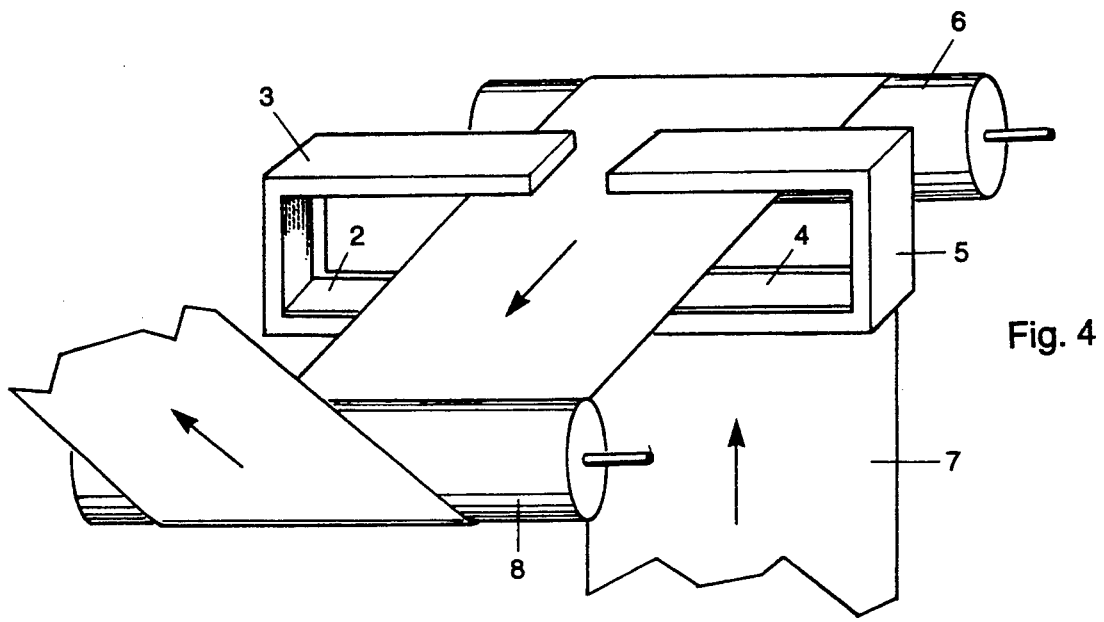
FIG. 4 is a schematic view of the shielded detector electrodes of FIG. 3 disposed about a moving conductive strip.

The C-shaped, shielded electrodes are disposed about a moving strip of conductive material 7 as shown in FIG. 4. Typically, the shielding electrodes embrace the moving strip of conductive material 7 on a section thereof arranged between two guide rollers 6. By using these detectors, it is possible to obtain information about lateral movement of the moving strip from its centered position between the two C-shaped detectors.

The strip is connected by some means to ground potential. Normally, this ground connection is a capacitive connection arising by the relatively large capacitive coupling of the strip with the machine, of which rollers 6 form only a small part, because of the relatively large size and metallic construction of the machine compared to the small size of the detector electrodes. Of course, those skilled in the art will appreciate that an additional connection to ground potential can be provided if the guide rollers 6 are also made out of a conductive material, such as metal.

In this way, each of the conductor electrodes 2 and 4 form a capacitor with strip 7. The capacitances are determined by the position of the strip. Thus, when the strip 7 is centered between the two detector electrodes 2 and 4, the capacitances between each detector electrode and the strip are equal to each other. If the strip moves off center, then the capacitances become unequal.

In order to receive an electrical signal indicating the strip position, the detector electrodes 2 and 4 are connected, as shown in FIG. 5, to an oscillator 8, each by way of a resistor R1 and R2. Those skilled in the art will appreciate that the capacitors formed by the electrodes 2 and 4 and the resistors R1 and R2 form an electrical bridge and that on the diagonal points 9 of the bridge, a voltage can be picked up indicating the position of the strip within the C-shaped electrodes 2 and 4. This voltage will be at a zero potential when the strip is centered between the C-shaped detector electrodes 2 and 4 because the bridge connection 9 under those circumstances is equalized.

The bridge connection 9 is amplified in an amplifier 10 and further processed by a demodulator 11 which provides an output from the sensor circuitry.

The sensor circuitry, as so far described, is susceptible to interference, for example, by a person 1 near the unit. This person would have an interfering influence on an unshielded detector electrode 2 because the person is typically at ground potential. Therefore, the capacitance between the electrode 2 and the strip 7 which is also at ground potential would increase as the person 1 moves closer to the electrode 2. Similarly, in moving equipment, the moving components of the equipment can also cause the capacitance between electrode 2 and ground potential to change merely in response to the normal movement of the machine.

This sort of interference can be prevented by providing shielding electrodes 3 and 4 whereby further capacitances are created between the electrode pairs 2 and 3 and also 4 and 5.

Additional circuitry is employed so that the capacitances between electrodes 2 and 3 on the one hand and 4 and 5 of the other hand have no influence on the voltage output of the bridge connection. In accordance with the present invention, no current flows over the capacitances formed between the shielding electrodes and the detector electrodes since the shielded electrodes 3 and 5 are loaded with exactly the same alternating current voltage that is supplied to the detector electrodes 2 and 4. As can be seen in FIG. 5, amplifiers 12 and 13 are connected to the diagonal points 9 on the bridge. These amplifiers have to be made in such a way that, even at high capacitive loading, they have a gain factor of exactly unity. The outputs of these amplifiers are connected with the shielded electrodes 3 and 5 by means of capacitors C1 and C2.

With this type of circuit arrangement, no current flows over the coupling capacitances of the electrode pairs 2, 3 on one hand and 4, 5 on the other, and thus the capacitances may differ in size without interfering with the detection of strip position. Thus, the installation of additional capacitors to prevent imbalances due to machine parts moving near the sensors, as was done in the prior art, is no longer required with the present invention.

The sensitivity of the device to position changes of the strip can be quite high, especially compared to non-shielded electrodes, because the detector electrodes 2 and 4 no longer create unwanted capacitances with surrounding machine parts or with people 1. Also, due to the potential control of the shielded electrodes by means of amplifiers 12 and 13, there is no current flowing over the capacitances formed with the shielded electrodes. Thus, an interference that is variable in time, such as person 1, will not have an interfering influence on the detector electrode 2 since amplifier 13, for example, is capable of providing the capacitive shunt currents flowing out to person 1 without a change in its output voltage. Thus, the impedance of capacitors C1 and C2 in the working frequency range should be rather small.

The signal processing of the voltages at the bridge connection 9 is well known in the art and therefore is not described in detail herein. Generally speaking, as is shown in FIG. 5, the bridge connection 9 is amplified by an amplifier 10, the output of which is applied to a demodulator 11. The demodulator is preferably a synchronized demodulator, and at its output a direct current voltage is available which corresponds to the incoming alternating current.

Those skilled in the art will appreciate that resistors R1 and R2 can be replaced by capacitors or inductances, if desired, forming circuit impedances. Amplifiers 10, 12 and 13 are preferably operational amplifiers such as type 34180 sold by Motorola. The modulator 11 can be a CD4007 device sold by RCA and wired in a transmission gate mode.

FIG. 6 is a schematic representation of an alternate embodiment of the C-shaped electrodes of FIGS. 1–5. In this embodiment, additional shielding electrodes 18 and 19 surround shielding electrodes 3 and 5. Shielding electrodes 18 and 19 are connected to ground potential. There is no particular need to maintain special clearances, although shielding electrodes 18 and 19 are capacitively coupled and not ohmically coupled to electrodes 3 and 5. The shielding electrodes 18 and 19 provide additional shielding which should be used when strong outside influences can otherwise effect the detector. The detection of this strip 7 within the detector operates in the manner described above.

Figure 7:
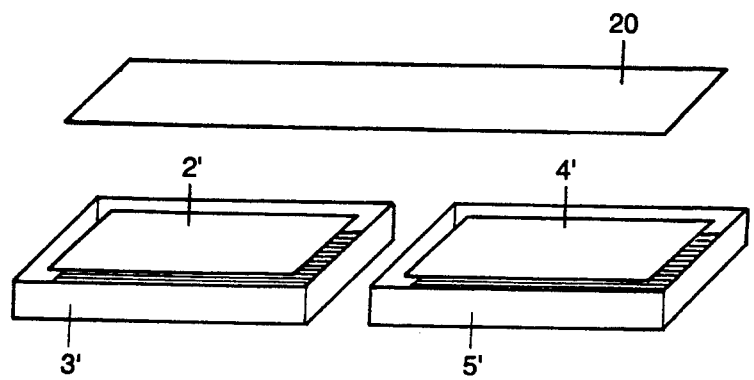
FIG. 7 is a perspective view of a second embodiment of the shielded detector electrodes in spatial cooperation with a transmittal electrode acting as a counter element.
Figure 8:
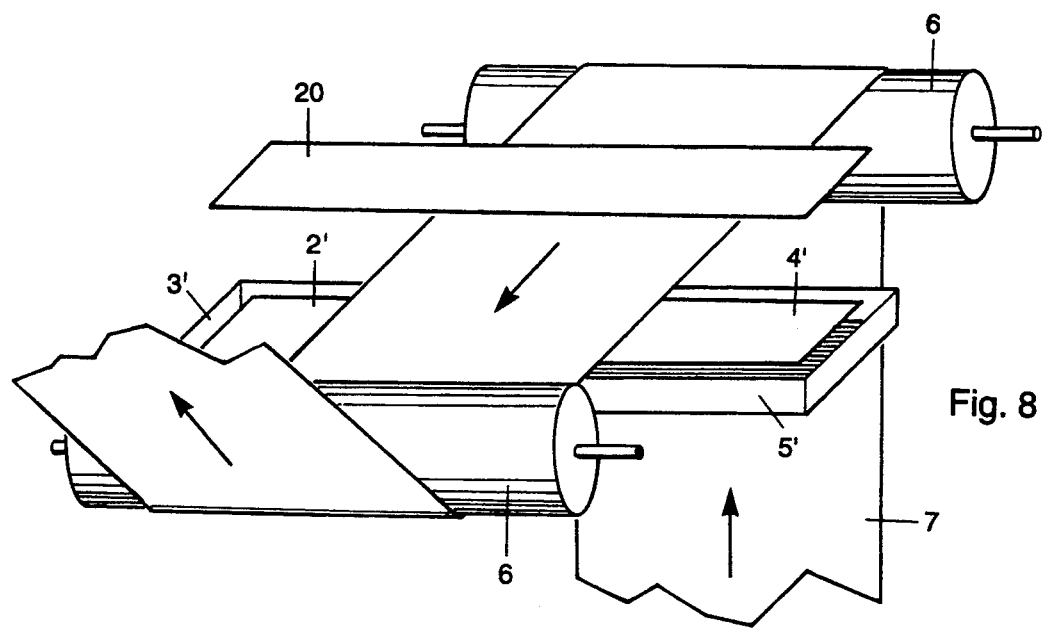
FIG. 8 is a perspective view of the electrode structure of FIG. 7 arranged about a moving conductive strip.

A second embodiment of detector electrodes and counterelements is shown in FIGS. 7 and 8. Here the reference numerals have a prime in order to differentiate them from the corresponding element in the prior embodiment. In this embodiment the detector electrodes 2' and 4' are arranged parallel to each other and each is arranged on one side of the moving strip, such as under the moving strip as can be seen in FIG. 8. The detector electrodes 2' and 4' are provided with shielding electrodes 3' and 5' which are arranged to shield them against disturbing influences from below in FIGS. 7 and 8 and also from the sides.

Using flat electrodes has an advantage over using C-shaped electrodes in that if a strip 7 curls, the curled edge of the strip at the C-shaped sensor can "fool" the sensor system into giving a false reading. As previously discussed, the use a sensor having flat electrodes can overcome this difficulty.

A counterelement 20 cooperates with the detector electrodes and, in this case, acts as a transmitting electrode. As can be seen from FIG. 9, it is connected to the oscillator 8'. The transmitting electrode 20 extends above the strip in FIGS. 7 and 8 and is disposed parallel to it and in a direction across the strip. Thus, its ends extend over both edges of strip 7. In this way, the position of the strip influences the capacitive coupling between the detector electrodes 2' and 4' on one part and the transmitting electrode 20 on the other part.

The transmitting electrode 20 does not need to be shielded when the oscillator 8' is constructed in such a way that its output voltage stays constant at a capacitive load reversal.

The detector electrodes 2' and 4' are connected to resistors R1' and R2', both of which are connected to ground potential. When the strip 7 is centered between the detector electrodes 2' and 4', the capacitances formed between the electrodes 2' and 20 on one part and 4' and 20 in the other part, are then the same. Of course, those skilled in the art will appreciate that these capacitances, as well as the resistors R1' and R2' form a bridge connection which is only balanced when the strip 7 is centered between the detector electrodes 2' and 4'. The output of the bridge is signal processed as previously described with reference to FIG. 6. The shielding electrodes 3' and 5' are connected to amplifiers 12' and 13' at the diagonal points 9 of the bridge connection. Amplifiers 12' and 13' function in the same manner as amplifiers 12 and 13 in the embodiment described with reference to FIG. 6.

Figure 9:
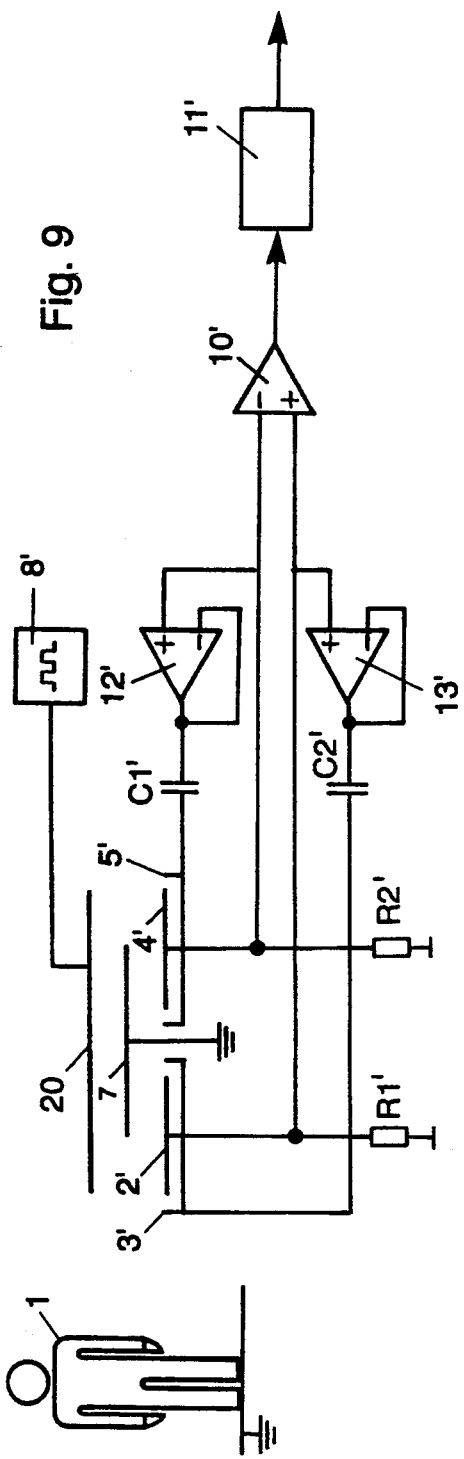
FIG. 9 is a circuit schematic of circuitry adapted by use with the electrode structure of FIGS. 7 and 8.
Figure 10:
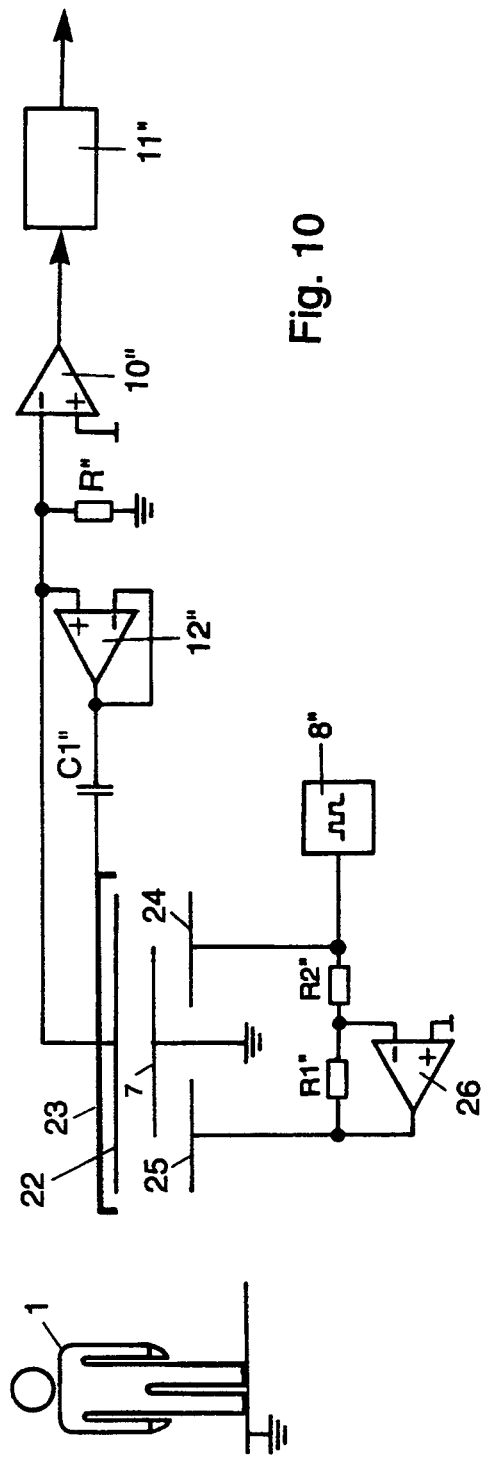
FIG. 10 is a schematic of a third embodiment having one shielded detector electrode and two transmitting electrodes loaded in phase opposition, interfacing with the detector electrode as a counter element.

Turning to FIG. 10, it is a circuit schematic of a third embodiment of the circuitry and the electrodes. Here similar or corresponding elements are shown with double primed reference numerals. In comparison with FIG. 9, the physical arrangement of the electrodes are quite similar. However, in this case, the top electrode 22 is now provided with an appertaining shielding electrode 23 and the capacitively coupled counterelement now comprises two transmitter electrodes 24 and 25, which do not need to be shielded. The transmitting electrode 25 is loaded with a voltage that is in phase opposition to that supplied to electrode 24. This phase opposition voltage is generated by amplifier 26. Those skilled in the art will appreciate, of course, that the antiphase voltage can be provided by other suitable devices or by a suitable repeater. In this embodiment, detector electrode 22 acts as a receiving electrode. Its signal voltage is amplified by amplifier 10' whose output is connected to demodulator 11'.

When the strip 7 is centered between transmitter electrodes 24 and 25, the capacitances formed between the electrode pairs 22 and 24 on one side and 22 and 25 on the other side, are equal and thus the influence of the two antiphase transmitter voltages on detector electrode 22 is nullified. Thus, when the strip is centered between the transmitting electrodes, the outputted voltage is zero. However, when the strip moves laterally, the influence of one of the transmitter electrodes starts to predominate the detector electrode and thus a signal voltage can then be measured at the input to operational amplifier 10''.

The embodiment of FIG. 10 is simpler to manufacture and makes lower demands on tolerance. In the previously disclosed embodiments attention should to be paid to ensure that the output of the detector electrodes and the information-bearing signal received from them arrive at the differential amplifiers 10, 10' by signal channels that exhibit exactly the same conditions to assure an accurately generated differential signal by the amplifier Such strict requirements are eliminated by the preferred embodiment of FIG. 10.

Those skilled in the art will appreciate, of course, that the detector electrodes of the second and third embodiments can be surrounded with additional, grounded shielded electrodes such as previously described with reference to FIG. 6. The amplifiers shown in FIGS. 9 and 10 are preferably operational amplifiers which may be provided by the same device as previously described. The demodulators 11' and 11'' may also be the same device as previously described with reference to demodulator 11.

Having described the invention in connection with certain preferred embodiments thereof, modification may now suggest itself to those skilled in the art. The invention is not to be limited to the disclosed embodiments, except as required by the appended claims.

What is claimed is:

1. A sensor device, comprising:
   a grounded strip of conductive material where the strip has opposite sides and opposite edges;
   a transmitter electrode disposed on one side of the strip and having portions extending beyond the respective opposite edges of the strip;
   two detector electrodes, each detector electrode being disposed on the side of the strip, opposing the transmitter electrode, the transmitter electrode being capacitively coupled to the strip;
   two shielding electrodes, each shielding electrode being associated with one of the detector electrodes;
   amplifier means having a unity gain factor connected to said shielding electrodes such that the potential on each shielding electrode follows the potential on each respective detector electrode; and
   means connected to each of the detector electrodes for outputting a signal indicating the position of the strip of material relative to the position of the detector electrodes and the transmitting electrode.

2. The sensor device of claim 1, wherein said detector electrodes are defined further as being coupled to ground via circuit impedances and wherein an information bearing signal is available at junctures between said circuit impedances and said detector electrodes.

3. A sensor device, comprising:
   a grounded strip of conductive material where the strip has opposite sides and opposite edges;
   two transmitter electrodes, each transmitter electrode being disposed on one side of the strip;
   a detector electrode disposed on the side of the strip opposing the transmitter electrodes, the transmitter electrodes being capacitively coupled to the strip;
   a shielding electrode associated with the detector electrode;
   amplifier means having a unity gain factor connected to the shielding electrode such that the potential on the shielding electrode follows the potential on the detector electrode; and
   means connected to the detector electrode for outputting a signal indicating the position of the strip of material relative to the position of the detector electrode and the transmitting electrodes.

4. The sensor device of claim 3 wherein said two transmitter electrodes are defined further as being connected to an oscillator by circuit means such that the transmitter electrodes are loaded in phase opposition to each other.

* * * * *

UNITED STATES PATENT AND TRADEMARK OFFICE
CERTIFICATE OF CORRECTION

PATENT NO. : 5,394,095
DATED : February 28, 1995
INVENTOR(S) : Kespohl

It is certified that error appears in the above-indentified patent and that said Letters Patent is hereby corrected as shown below:

Column 1, line 64, please delete "of the total capacitance".

Column 3, line 61, please delete "conductor" and substitute therefor -- detector --.

Column 4, line 30, please delete "shielding electrodes 3 and 4" and substitute therefor -- shielding electrodes 3 and 5 --.

Column 4, line 35, please delete "of" and substitute therefor -- on --.

Column 5, line 32, please delete "effect" and substitute therefor -- affect --.

Column 5, line 51, please delete "the" and substitute therefor -- to --.

UNITED STATES PATENT AND TRADEMARK OFFICE
CERTIFICATE OF CORRECTION

PATENT NO. : 5,394,095
DATED : February 28, 1995
INVENTOR(S) : Kespohl

It is certified that error appears in the above-indentified patent and that said Letters Patent is hereby corrected as shown below:

Column 6, line 20, please delete "are" and substitute therefor -- is --.

Column 6, line 55, please insert --.-- after the word "amplifier".

Signed and Sealed this

Thirteenth Day of June, 1995

Attest:

BRUCE LEHMAN

*Attesting Officer*  *Commissioner of Patents and Trademarks*